United States Patent [19]
Chang

[11] Patent Number: 5,472,234
[45] Date of Patent: Dec. 5, 1995

[54] SAFETY BELT SET FOR DAMPING BACK DIRECTED IMPACT FORCE

[76] Inventor: Chun-Hsiung Chang, No. 5-4, Lane 201, Chung-Hua Rd., Pa Te Hsiang T'ao-Yuan Hsien, Taiwan

[21] Appl. No.: 248,685

[22] Filed: May 25, 1994

[51] Int. Cl.⁶ .................................................. B60R 22/00
[52] U.S. Cl. ...................... 280/808; 280/801.1; 297/479; 297/483
[58] Field of Search ............................. 280/806, 801.1, 280/808, 748; 297/464, 468, 479, 480, 483; 296/68.1

[56] References Cited

U.S. PATENT DOCUMENTS

| | | | |
|---|---|---|---|
| 3,222,084 | 12/1965 | Hesen | 280/748 |
| 4,541,654 | 9/1985 | Jonasson | 280/801.1 |
| 4,702,491 | 10/1987 | Meyer | 280/801.1 |
| 5,328,226 | 7/1994 | Thomas | 280/748 |

FOREIGN PATENT DOCUMENTS

9202389  2/1992  WIPO .................................. 280/808

*Primary Examiner*—Eric D. Culbreth
*Attorney, Agent, or Firm*—Bacon & Thomas

[57] ABSTRACT

A safety belt set having backstop effect for use in a car. The safety belt set mainly includes two auto-lock sets separately connecting with two hanging members mounted on two center pillars of the car. A back-extending safety belt extends behind two front seats of the car with its two ends separately attaching to a damped fastening member of the auto-lock sets. The auto-lock set also allows a front-extending safety belt to pass therethrough so that when the car is impacted by a sudden violent back-coming force, the backward inclined front seats exert a back pull on the back-extending safety belt which causes the damped fastening member to tightly clamp the back-extending safety belt and the auto-lock sets to lock up the front-extending safety belt. Thus, the back and the front extending safety belts together secure the passenger and/or the driver to the front seats without becoming overly backward inclined and being hurt due to the broken front seat backs.

5 Claims, 10 Drawing Sheets

SAFETY BELT SET FOR DAMPING BACK DIRECTED IMPACT FORCE

BACKGROUND OF THE INVENTION

The present invention relates to a safety belt set having a damping effect, and more particularly to a safety belt set mounted in a car to serve as a safety means to protect the front seat backs from breaking when the car is suddenly impacted by a violent back-directed force and to firmly secure the passengers on the front seats to the seats. The present invention includes a back safety belt part and a front safety belt part. The back safety belt part thereof can be used alone on a car which has been delivered from an automotive shop, or be mounted on a car together with the front safety belt part before the car is delivered.

Safety belts have become necessary internal equipment for the existing cars to protect the passengers in traffic and to be in compliance with relevant laws and regulations. A conventional safety belt, either an oldest type with fixed length, or a common type with automatically retracting and rewinding ability, can only secure the passenger to the seat to prevent the same from dangerously inclining forward under a sudden front-directed impact force when the belt is properly fastened.

As a matter of fact, when a car is otherwise suddenly impacted by a violent back-directed force, the portions in the car which are directly subjected to the most serious destruction shall be the front seats. The pivots between the seat and the back are usually the points of breaking. At this time, since the passenger and the driver on the front seats shall be subjected to an inertia relative to the car in a direction just reverse to that would have been found when the car is impacted by a front-directed force, the conventional safety belts which secure the passenger and the driver to the seats shall disadvantageously facilitate the breaking of the seat backs due to the inertia force. In other words, the conventional safety belt does not function to prevent any backward inclination of the driver and the passenger when the car is impacted by a back directed force and therefore, body injury to the neck, waist, spine, and/or legs frequently occurs due to the broken seat backs.

To prevent any accidental explosion of the fuel tank, the Federal Government of the United States requires at least five of every newly developed cars to accept and pass an impact test in which a car is subjected to a back directed impact force at a speed of 48 Km/hr. According to the test criteria, the tested car should not have any fuel tank explosion under such a condition. In the tests done, it has been found at least the GM Oldsmobile 1978 Delta, Chrysler 1988 Plymouth Sundance, Ford 1979 Thunderbird, Toyota 1982 Celica, Mitsubishi/Chrysler 1978 Plymouth Sapporo, Subaru 1979 DL1600, and Honda 1980 Prelude have dangerously collapsed driver seats when these tested cars are impacted by a back directed vehicle running at a speed of 48 km/hr.

It is therefore the purpose of the invention to develop a safety belt set having backstop effect to eliminate the above shortcoming in the conventional safety belts.

SUMMARY OF THE INVENTION

A primary object of the invention is to provide a safety belt set having a damping effect, which is mounted to a car before the same is delivered from the automotive shop. The safety belt set according to the present invention includes two regular front-extending safety belts which separately extend across the chest of the driver and the passenger so as to secure them on the front seats, and a back-extending safety belt extending across the backside of the front seats. With the front and the back extending safety belts, the driver and the front seat passenger can be safely secured to the seats and protected from being seriously hurt either in front-directed or in a back directed impact.

Another object of the present invention is to provide a safety belt set having a damping effect, which can be easily and directly added or assembled to a conventional anti-front-inclination safety belt to form an integral safety device.

A safety belt set having a damping effect according to the present invention mainly includes front-extending safety belts, belt winding devices, and automatic belt winding brake devices which are all known in the prior art, as well as a back-extending safety belt and two auto-lock sets. The auto-lock sets each consists of a fixed receiving member and a fastener member detachably received in the fixed receiving member, both of which allow the front-extending safety belt to pass therethrough. The back-extending safety belt extends behind a back side of the two front seats and has two ends separately connected to the damped fastening members. The front-extending safety belt has one end extended through the auto-lock set and connected to the belt winding brake device disposed inside the center pillar of the car. Thereby, when the car is impacted by a sudden violent back directed force, the back-extending safety belt is subjected to a backward pull exerted on it by the backward inclined front seats and thereby pulls the fastener members to tightly clamp the back-extending safety belt and actuate the belt winding brake devices to permit the front-extending safety belts to, together with the back-extending safety belt, firmly secure the driver and/or the front seat passenger to the front seats to protect them from being hurt due to an overly backward inclination of seat backs.

BRIEF DESCRIPTION OF THE DRAWINGS

The present invention can be best understood by referring to the following detailed description of the preferred embodiment and the accompanying drawings, wherein

FIG. 3-A is a side sectional view according to FIG. 3, showing a fastener member attached to a fixed receiving member;

FIG. 4-A is a side sectional view of FIG. 4, showing the fastener member having been pulled out of the fixed receiving member and turned around;

DETAILED DESCRIPTION OF THE PREFERRED EMBODIMENT

Figure 1:
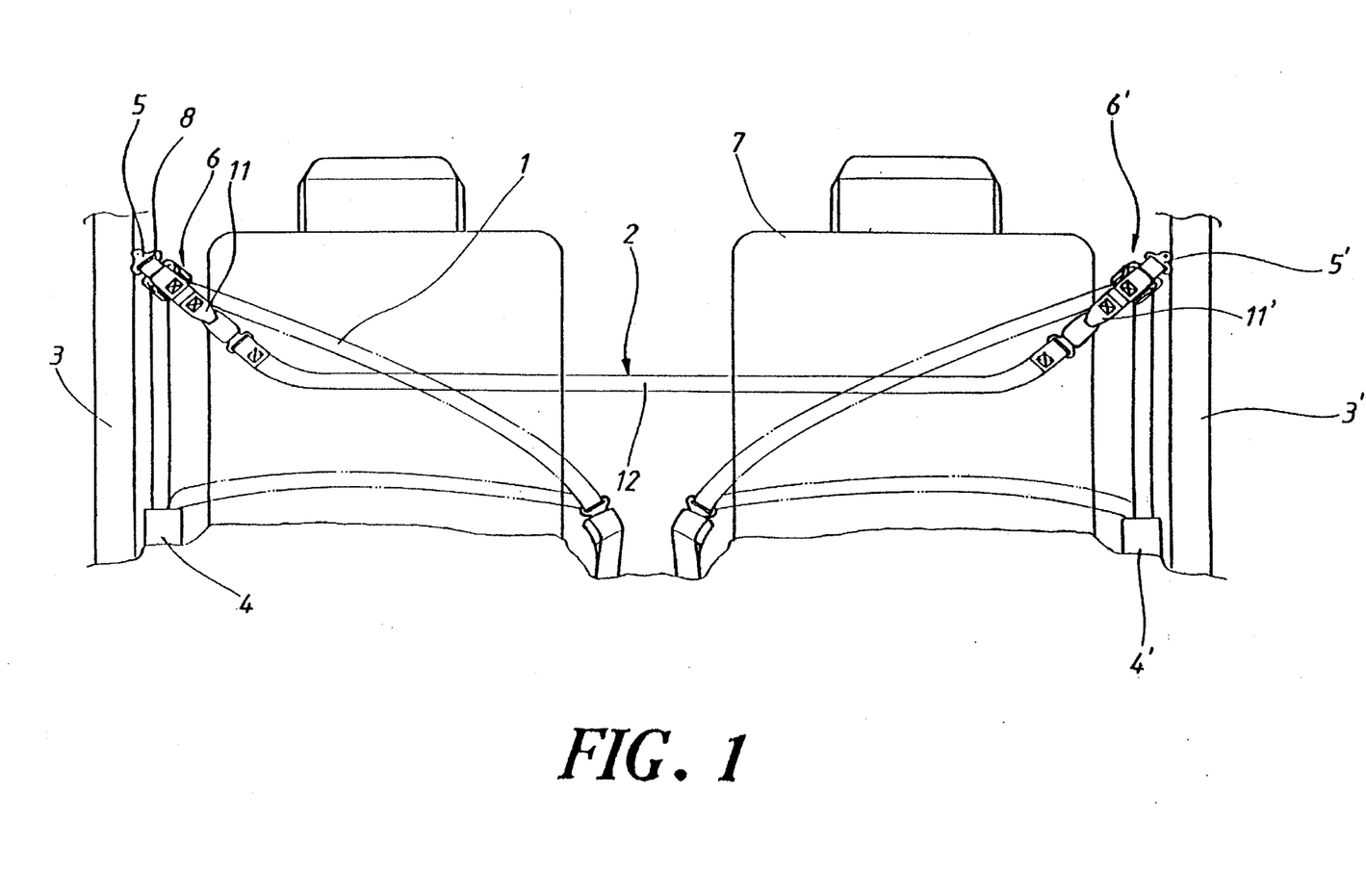
FIG. 1 is a rear view showing the position of the present invention relative to the front seats in a car.
Figure 2:
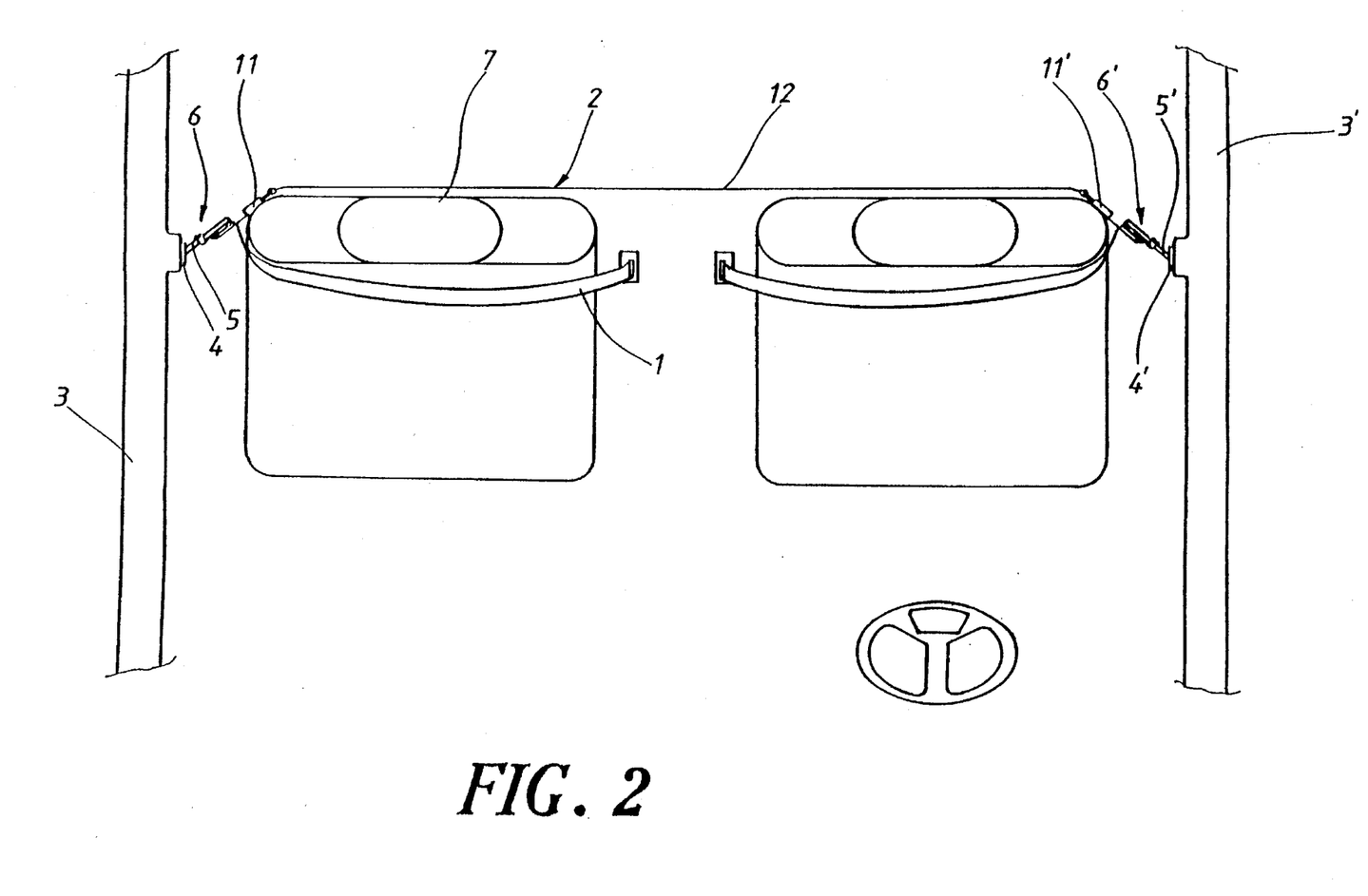
FIG. 2 is a top view showing the position of the present invention relative to the front seats in the car.

Please now refer to FIGS. 1 and 2. The present invention is a safety belt set having backstop effect for use in a car, and consists of two front-extending safety belts 1 and one back-extending safety belt 2. Each front-extending safety belts 1 is attached to a center pillar 3 or 3' of the car by passing through a hanging member 5 or 5' mounted near an upper end of the center pillar 3 or 3' and a conventional belt winding brake device 4 or 4' mounted near a lower end of the center pillar 3 or 3'. The hanging members 5, 5' each have a slot 8 through which the front-extending safety belt 1 passes and therefore serve as supporting points of the two front-extending safety belts 1. Auto-lock sets 6 and 6' are connected to the hanging members 5 and 5', respectively, to attach the back-extending safety belt 2 between them.

Figure 8:
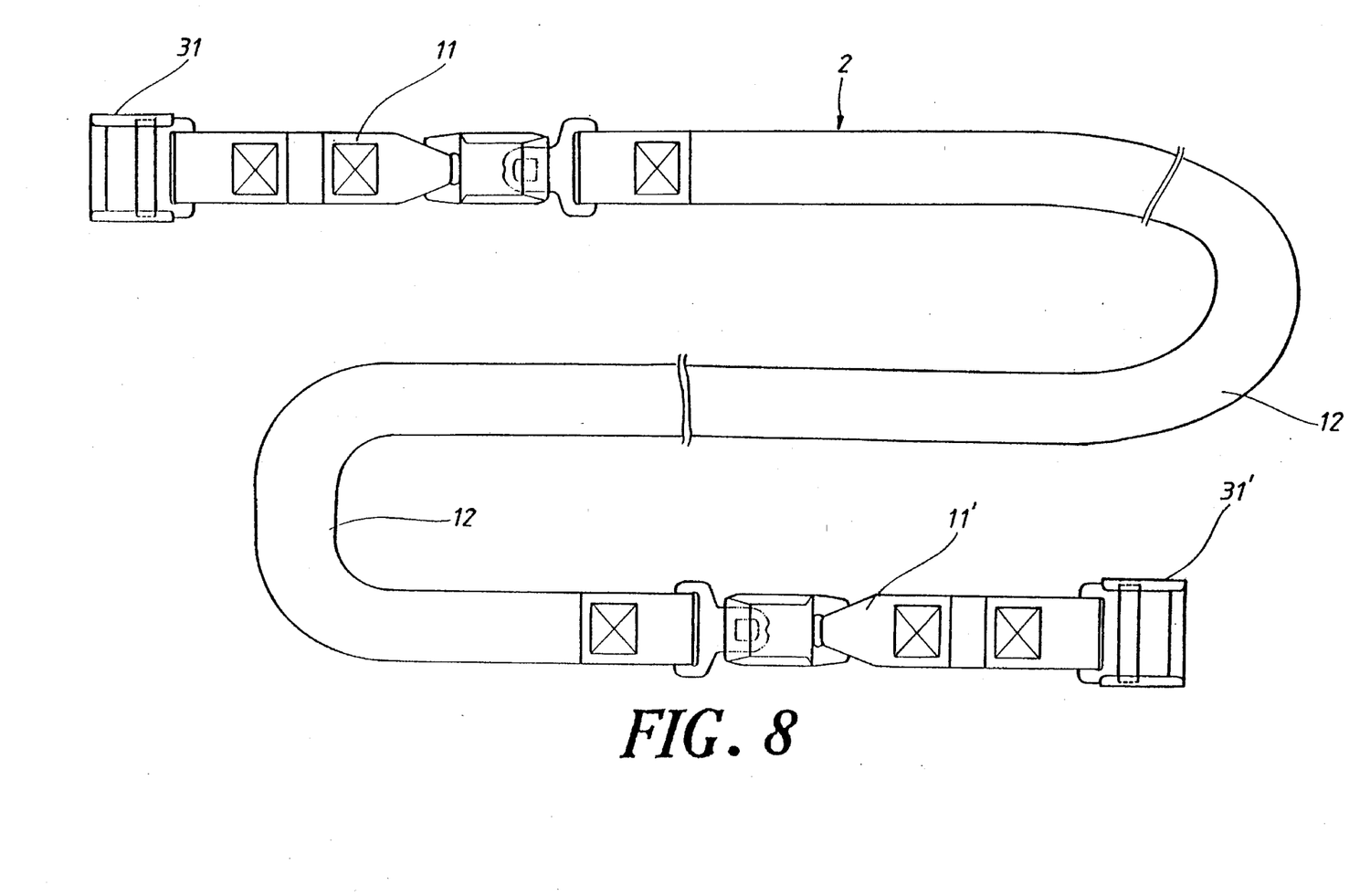
FIG. 8 is a schematic view of the back-extending safety belt consisting of a secondary hanging strap.

The back-extending safety belt 2 extends across the back side of two front seats 7 of the car and further includes two first hanging straps 11, 11' separately disposed at a right and a left side of the back-extending safety belt 2, and a secondary hanging strap 12 connected at two ends to the first hanging straps 11, 11' and extending between the latter, as shown in detail in FIG. 8. With these arrangements, the front seats 7 and users therein are protected both from their front and back sides by the present invention. In another embodiment, the front seats 7 may each be provided with a separate back-extending safety belt 2 with one end thereof fastened to the auto-lock set 6 or 6' and the other end thereof retained to some other retaining means fixed to the car or its attachments at a position or proper point near an opposite side of the seat 7.

Figure 3:
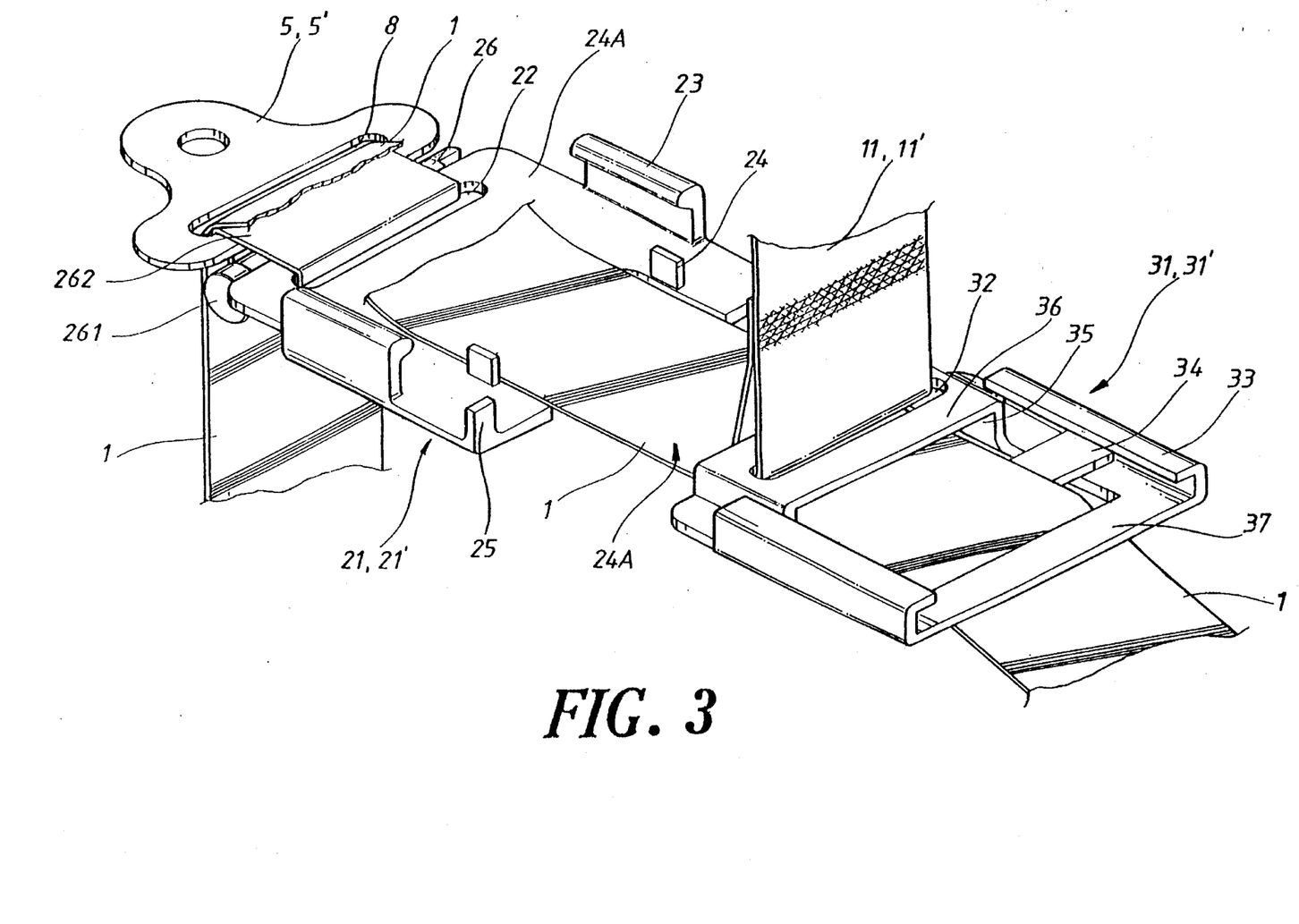
FIG. 3 is a partial perspective view showing the manner in which the first hanging strap connects with the front-extending safety belt of the present invention.
Figure 5:
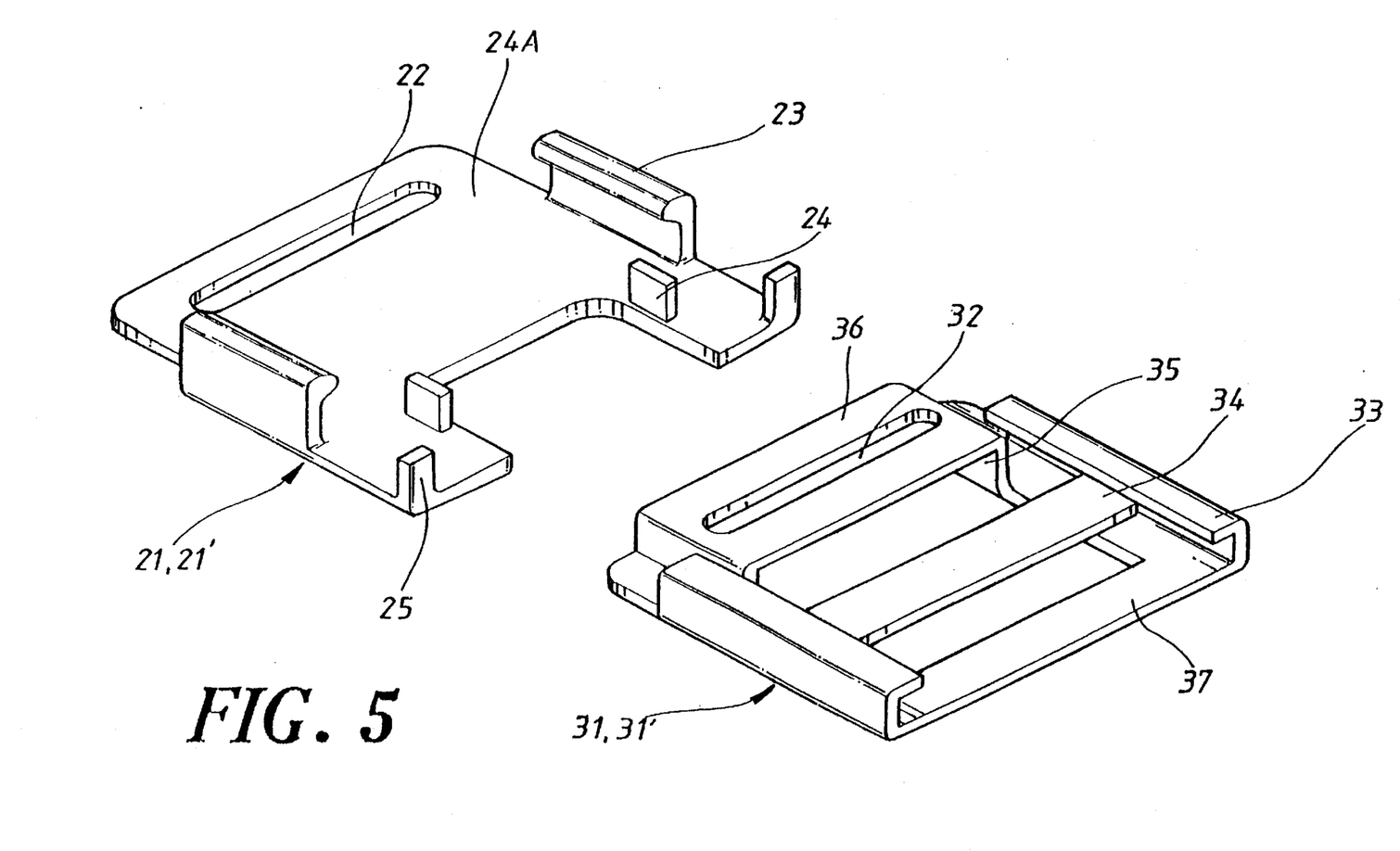
FIG. 5 is a perspective view showing the detailed structure of the fastener member and the fixed receiving member in a mutually detached state.
Figures 9, 10:
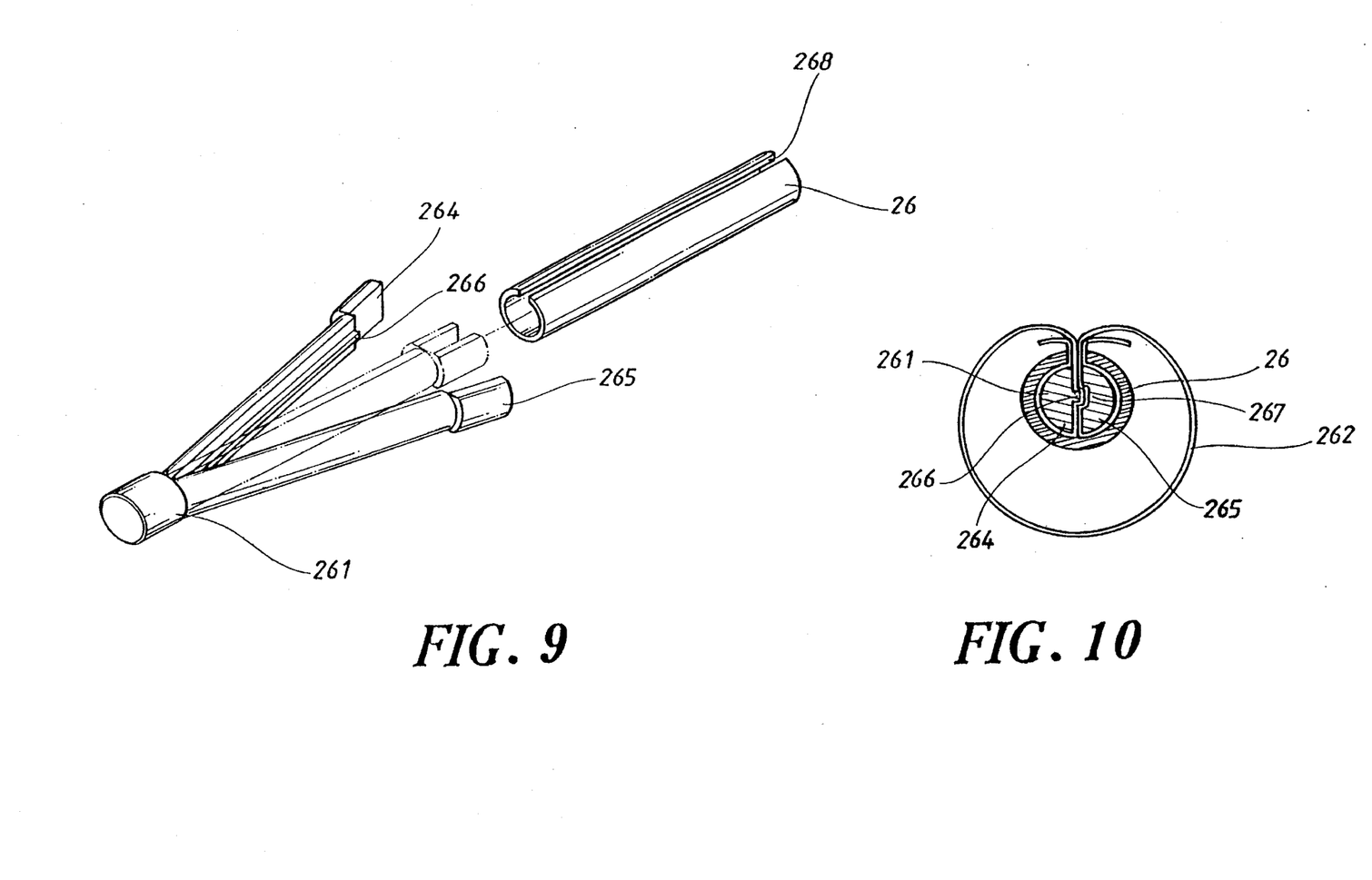
FIG. 9 shows the insertion pin and the associated sleeve of the present invention.
FIG. 10 is a side sectional view showing the assembled insertion pin and the associated sleeve, with a connection strap firmly clamped therebetween.

Please now refer to FIGS. 3 and 5 in which the connection manner of the front-extending safety belt 1 with the first hanging strap 11 or 11' of the back-extending safety belt 2 is shown. The front-extending safety belt 1 first passes through one of the hanging members 5 or 5' via its slot 8 and then passes through one of the auto-lock sets 6 or 6'. The auto-lock sets 6, 6' each of which consists of a fixed receiving member 21, 21', respectively, and a fastener member 31, 31', respectively. The fixed receiving member 21 or 21' is substantially a plate having a transversely extended retaining slot 22 formed at one end thereof, two upward extended side retaining walls 23, two positioning blocks 24, and two stoppers 25. The retaining walls 23, positioning blocks 24, and the stoppers 25 together define a space 24A for the front-extending safety belt 1 to pass therethrough. The fixed receiving member 21 or 21' is connected to the hanging member 5 or 5' by means of a connection strap 262 firmly clamped by an insertion pin 261 and an associated sleeve 26. As shown in FIGS. 9 and 10, two ends of the connection strap 262 separately pass through the slot 8 of the hanging member 5 or 5' and the retaining slot 22 of the fixed receiving member 21 or 21', and then are firmly clamped between the insertion pin 261 and the associated sleeve 26. Pin 261 includes a pair of separable pin legs 264 and 265, with leg 264 being provided with an axially extending tenon 266 and leg 265 being provided with a corresponding axially extending mortise 267. Sleeve 26 is provided with an axially extending slot 268 formed therein.

Figure 6:
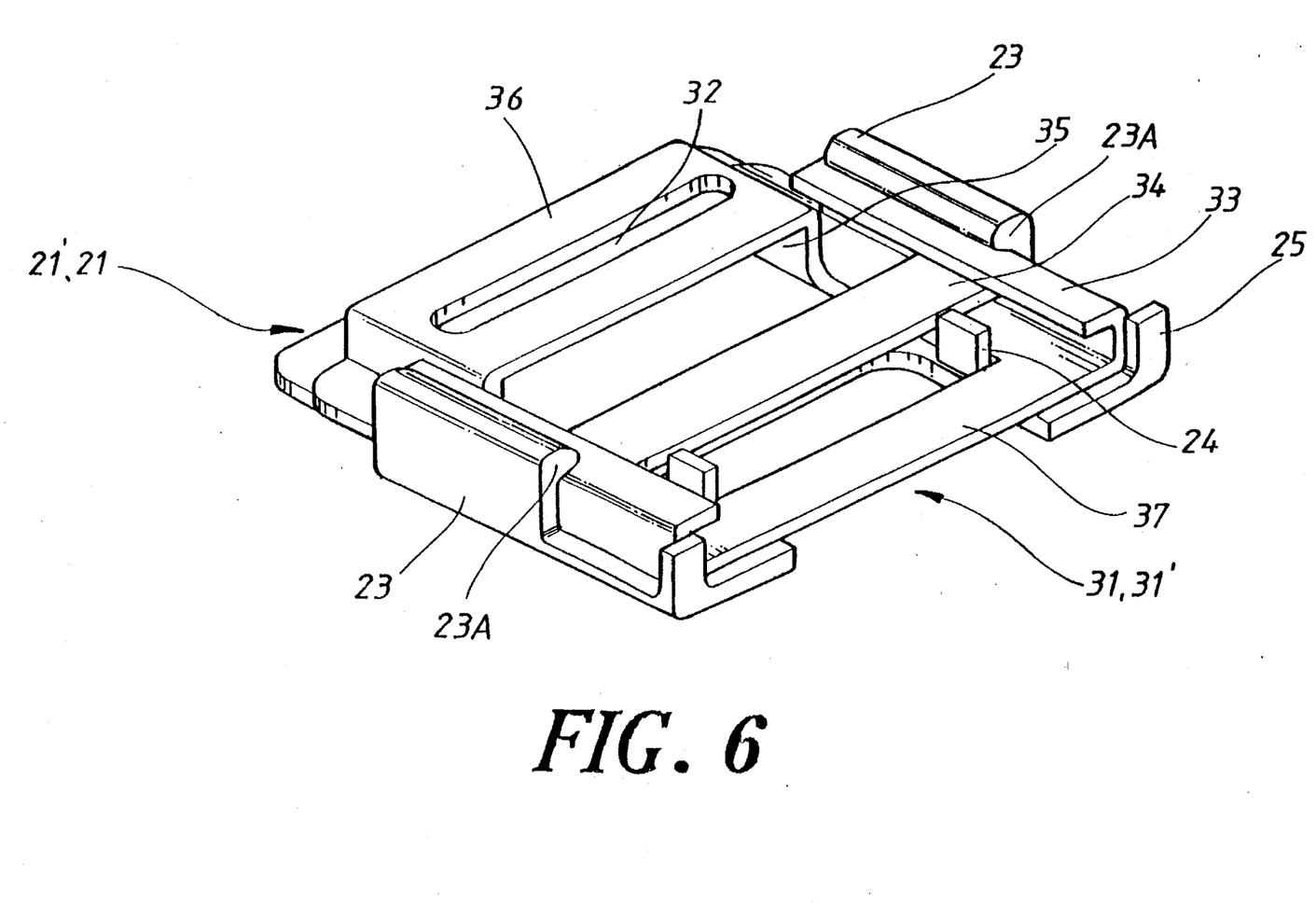
FIG. 6 is a perspective showing the damped fastener received in the fixed receiving member.
Figure 7:
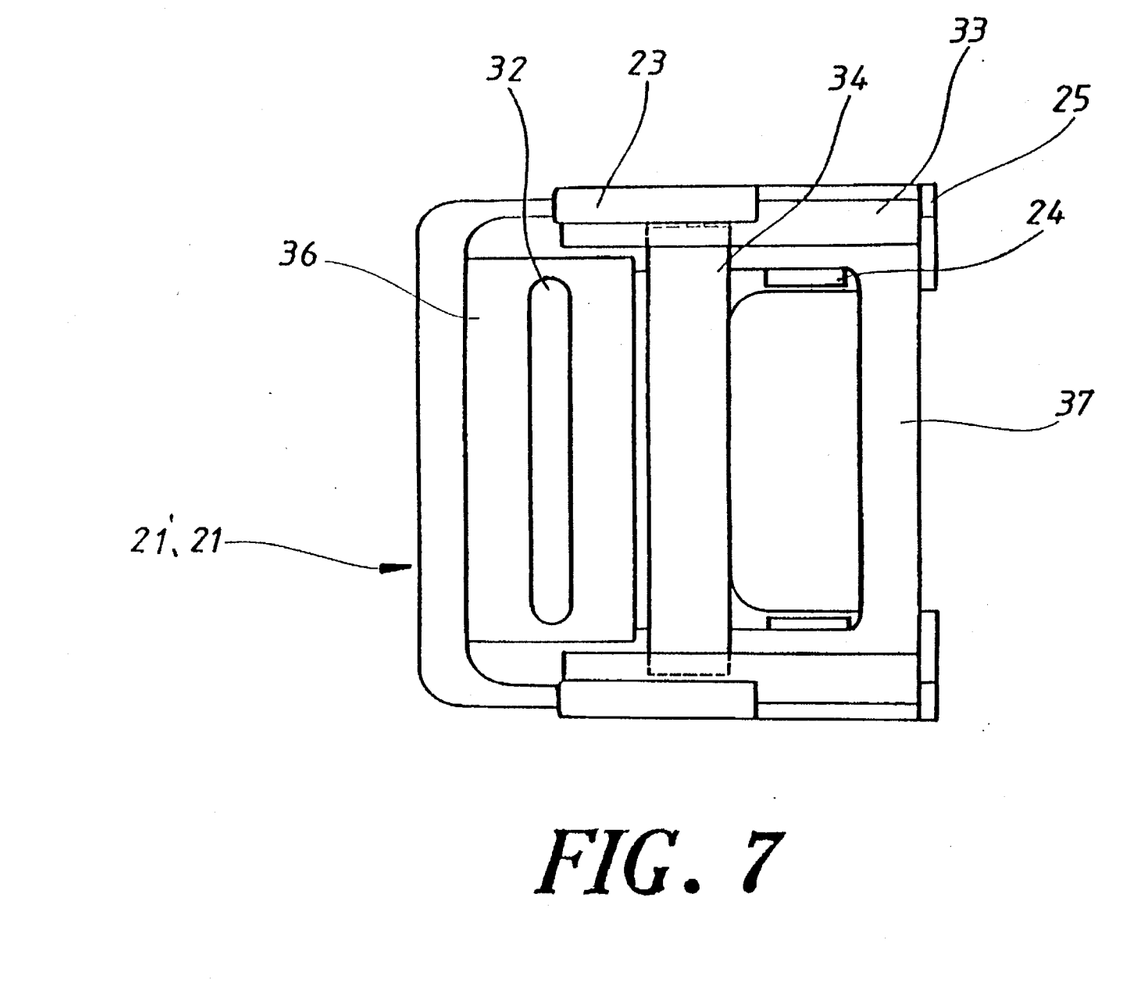
FIG. 7 is a top view of FIG. 6.

Please refer to FIGS. 3, 5, and 6. The fastener, member 31 or 31' is one preferred embodiment of common dampers and includes a transversely extended retaining slot 32 on a raised portion 36 formed at one end thereof, two enveloping side walls 33, and a sliding plate 34 transversely disposed between the two enveloping side walls 33 to slidably move between the raised portion 36 and an end plate 37 of the fastener member 31 or 31'. The raised portion 36 has a height slightly higher than that of the enveloping side walls 33 and defines an enveloped space 35 thereunder for the front-extending safety belt 1 to pass therethrough. The entire fastener member 31 or 31' may be completely received in the fixed receiving member 21 or 21' with the positioning blocks 24 bearing against the sliding plate 34 at a side facing the end plate 37, the retaining walls 23 and flanges 23A wrapping an outer surface of the two enveloping side walls 33, and the stoppers 25 abutting on two outer corners of the damped fastener 31 or 31' between the end plate 37 and the two enveloping walls 33.

Figure 3A:
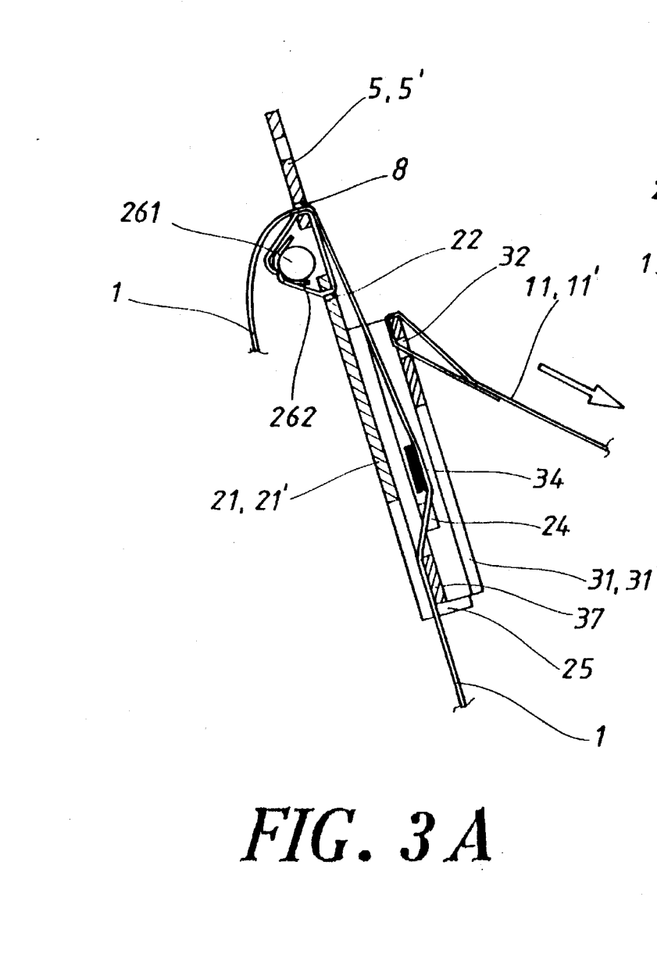

As shown in FIGS. 3 and 3-A, the front-extending safety belt 1, after passing through the hanging member 5 or 5' via the slot 8, keeps extending into the enveloped space 35 of the fastener member 31 or 31', passing over the sliding plate 34, and then passing down through the end plate 37. The first hanging straps 11, 11' of the back-extending safety belt 2 is connected to the fastener member 31 or 31' by passing through the retaining slot 32 and forming a loop to attach thereto.

Figure 4:
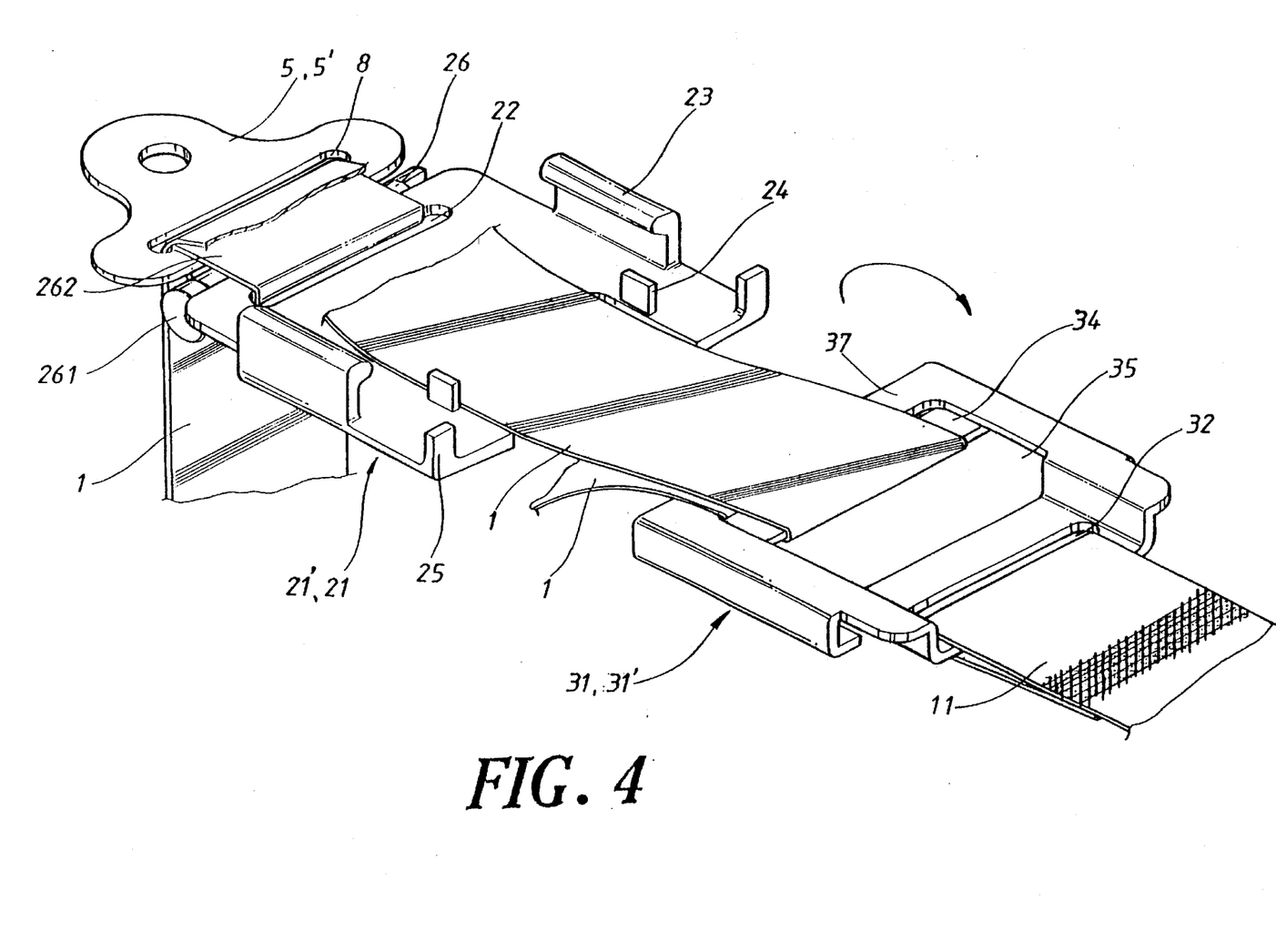
FIG. 4 is a partial perspective view similar to FIG. 3, in which the first hanging strap has been pulled by the back-extending safety belt to pull the fastener member out of the fixed receiving member causing the fastener member to turn around such that the front-extending safety belt is firmly clamped between a sliding plate and an edge part of the damped fastener.
Figure 4A:
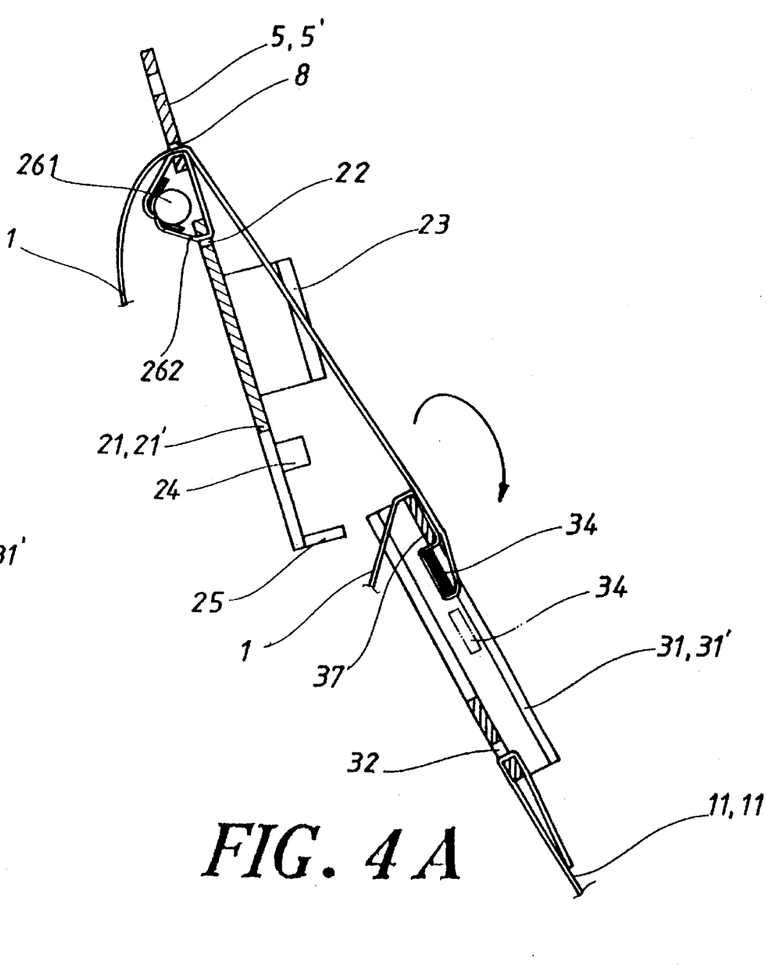

Please further refer to FIGS. 4 and 4-A. When the car is impacted by a sudden violent back-directed force, the front seats 7 incline backwardly and exert an instantaneous back force on the secondary hanging strap 12 of the back-extending safety belt 2 extending between the two first hanging straps 11, 11'. When the secondary hanging strap 12 is pulled backward by the back force of the backward inclined front seats 7, the pull force transfers to the first hanging straps 11, 11' and therefore pulls the fasteners members 31, 31' out of the fixed receiving members 21, 21', respectively, and causes the fasteners members 31, 31' to turn upside down, as shown in FIG. 4-A. At this point, the stoppers 25 no longer stop the fasteners members 31, 31', and the sliding plates 34 separate from the positioning blocks 24 of the fixed receiving members 21, 21' to move toward the end plates 37 of the fasteners members 31, 31', tightly clamping the front-extending safety belts 1 between the sliding plates 34 and the end plates 37. This tight clamping of the front-extending safety belts 1 shall indirectly pull the front-extending safety belts 1 and force the belt winding brake devices 4, 4' mounted in the center pillars 3, 3', respectively, to tightly lock the safety belts 1, 2. This damping effect thereby effectively prevents the front seats 7 from inclining backward and breaking.

According to the above description, it can be seen that the present invention can be either integrally mounted on a car before it is delivered from an automotive shop or added to the conventional safety belts of a car after it has left the automotive shop. In addition to the simple and convenient assembling of the present invention to a car, the present invention provides an enhanced protection function in preventing the front seats of cars from inclining backward and thereby protects the drivers and front passengers from both their front and back sides.

What is claimed is:

1. A safety belt set for use in a car having a front seat, a left center pillar, a right center pillar, a left front extending safety belt having one end connected to a belt winding brake device, and a right front extending safety belt having one end connected to a belt winding brake device, the safety belt set comprising:

a) a hanging member for attachment to each center pillar;

b) an auto-lock set connected to each hanging member, each auto-lock set including a receiving member having a space formed therein for passing the front safety belt therethrough, a fastener member for detachable connection to the receiving member, and means carried by the fastener member for clamping the front safety belt thereto upon detachment of the fastener member from the receiving member;

c) a back safety belt for extending across the back of the front seat, the back safety belt including a pair of ends for attachment to the fastener members; and d) whereby in the event of a back directed impact force against the car, the resulting backward inclination of the front seat against the back safety belt causes the latter to detach the fastener members from the receiving members, thereby automatically clamping the front safety belts and activating the belt winding brake devices to dampen the impact force and prevent continued backward inclination of the front seat.

2. The safety belt set of claim 1 wherein the back safety belt includes:

a) a pair of first hanging straps;

b) a secondary hanging strap including two ends; and c) each first hanging strap including a first end connected to a fastener and a second end connected to an end of the secondary strap.

3. The safety belt set of claim 1 wherein:

a) the receiving member is substantially in the form of a plate and includes a transversely extending retaining slot formed at a first end of the plate, a pair of retaining walls extending upwardly from opposite sides of the plate and terminating in inwardly directed flanges, a pair of spaced stoppers at a second end of the plate, and a pair of spaced positioning blocks, with the retaining walls, positioning blocks and stoppers collectively defining the space for passing the front safety belt therethrough; and b) the fastener member including a raised portion formed at a first end thereof, a transversely extending retaining slot formed in the raised portion, a pair of enveloping sidewalls, an end plate at a second end thereof; and a sliding plate transversely disposed between the sidewalls for sliding movement between the raised portion and the end plate.

4. The safety belt set of claim 1 further including a strap assembly connecting each auto-lock set to the hanging member, each strap assembly including a strap loop having two ends and a clamping means securing the two ends together.

5. The safety belt set of claim 4 wherein the clamping means includes an insertion pin having two separable pin legs, one pin leg including an inner face provided with an axially extending tenon, the other pin leg including an inner face provided with an axially extending mortise, and a sleeve for receiving the insertion pin therein, the sleeve having an axially extending slit formed therein.

* * * * *